US008788391B2

(12) United States Patent
Mura

(10) Patent No.: US 8,788,391 B2
(45) Date of Patent: Jul. 22, 2014

(54) NUMERICAL MODELLING APPARATUS

(76) Inventor: Michael Mura, St. Albans (GB)

(*) Notice: Subject to any disclaimer, the term of this patent is extended or adjusted under 35 U.S.C. 154(b) by 0 days.

(21) Appl. No.: 12/946,878

(22) Filed: Nov. 16, 2010

(65) Prior Publication Data

US 2011/0167021 A1 Jul. 7, 2011

(30) Foreign Application Priority Data

Jan. 5, 2010 (GB) .................................. 1000089.1

(51) Int. Cl.
*G06Q 40/00* (2012.01)
(52) U.S. Cl.
USPC ............................. 705/36 R; 705/35; 705/37
(58) Field of Classification Search
CPC ......................................... G06Q 40/00–40/08
USPC ..................................................... 705/35–37
See application file for complete search history.

(56) References Cited

U.S. PATENT DOCUMENTS

| | | | |
|---|---|---|---|
| 5,819,238 A | 10/1998 | Fernholz | |
| 6,484,152 B1* | 11/2002 | Robinson | 705/36 R |
| 7,401,041 B2* | 7/2008 | Goldfarb et al. | 705/36 R |
| 7,620,577 B2 | 11/2009 | Arnott et al. | |
| 7,630,930 B2* | 12/2009 | Almgren et al. | 705/36 R |
| 2004/0199448 A1* | 10/2004 | Chalermkraivuth et al. | 705/36 |
| 2006/0190371 A1* | 8/2006 | Almgren et al. | 705/35 |
| 2007/0192241 A1* | 8/2007 | Metlapalli | 705/38 |
| 2007/0288397 A1* | 12/2007 | Frahm et al. | 705/36 R |
| 2008/0052249 A1* | 2/2008 | Jeng | 705/36 R |
| 2008/0208604 A1* | 8/2008 | Nishiyama et al. | 705/1 |
| 2008/0222252 A1 | 9/2008 | White | |
| 2008/0288420 A1* | 11/2008 | Michaud et al. | 705/36 R |
| 2009/0099976 A1* | 4/2009 | Kawamoto et al. | 705/36 R |
| 2009/0106133 A1* | 4/2009 | Redmayne | 705/35 |
| 2010/0057638 A1* | 3/2010 | Markov et al. | 705/36 R |
| 2011/0022539 A1* | 1/2011 | Joenk | 705/36 R |
| 2012/0116993 A1* | 5/2012 | Ouimet et al. | 705/36 R |
| 2014/0081889 A1* | 3/2014 | Renshaw | 705/36 R |

OTHER PUBLICATIONS

Llyod N. Trefethen and David Bau, III. "Numerical Linear Algebra"; Siam Society for Industrial and Applied Mathematics, Philadelphia; 1997.*
Wikipedia-2013 downloaded.*
Williams, John Burr, 1938; "The Theory of Investment Value," Harvard University Press, Cambridge MA.
Gordon, Myron J., 1959, "Dividends, Earnings and Stock Prices," Review of Economics and Statistics 41, pp. 99-105.

(Continued)

*Primary Examiner* — Narayanswamy Subramanian
(74) *Attorney, Agent, or Firm* — Novak Druce Connolly Bove + Quigg LLP

(57) ABSTRACT

A numerical modeling apparatus and method of performing numerical modeling are described. An input unit may receive information relating to set of assets. processor unit may provide Risk Relation Matrix V having elements that represent relationship of risk related to respective pair of the assets. The Risk Relation Matrix V may be decomposed into eigenvectors and eigenvalues according to $V = E \cdot \Lambda \cdot E'$, where E is set of eigenvectors of the risk matrix V in columns, $\Lambda$ is the corresponding diagonal eigenvalue matrix, and E' is the transpose of E. Components of risk vectors may be derived in terms of unit independent risks by the corresponding row of the matrix product $E \cdot \Lambda^{1/2}$ relating to respective assets. An output unit may output the risk vector components of the risk vectors as risk vector dataset.

14 Claims, 2 Drawing Sheets

(56) References Cited

OTHER PUBLICATIONS

Lintner, John, 1965, "The Valuation of Risk Assets and the Selection of Risky Investments in Stock Portfolios and Capital Budgets," Review of Economics and Statistics, 47:1, pp. 13-37.

Markowitz, Harry, 1952, "Portfolio Selection," Journal of France, 7:1, pp. 77-91.

Markowitz, Harry, 1959, " Portfolio Selectoin: Efficient Diversification of Investments," Cowles Foundation Monograph No. 16, New York, John Wiley & Sons, Inc.

Markowitz, Harry, 2008, "CAPM Investors Do Not Get Paid for Bearing Risk: A Linear Relation Does No Imply Payment for Risk," Journal of Portfolio Management, 34: 2 (Winter), pp. 91-94.

Mossin, Jan, 1966, Equilibrium in a Capital Asset Market, Econometrica, 34, pp. 768-783.

Roll, Richard , 1977, "A Critique of the Asset Pricing Theory's Tests," Journal of Financial Economics, 4:2, pp. 129-176.

Sharpe, William F., 1964, "Capital Asset Prices: A Theory of Market Equilibrium under Conditions of Risk," Journal of France, 19:3, pp. 425-442.

Tobin, James, 1958, "Liquidity Preference as Behavior Toward Risk," Review of Economic Studies, 67, pp. 65-86.

Duffie, Darrell, 1996, "Dynamic Asset Pricing Theory (Second Edition)," Princeton University Press, Princeton, New Jersey.

Megginson, William L., 1997, "Corporate Finance Theory," Addison-Wesley, New York, Section 3.5.5 and chapter 4.

Choueifaty, Yves and Yves Coignard, 2008, "Toward Maximum Diversification," Journal of Portfolio Management, Fall 2008, 35:1, pp. 40-51.

\* cited by examiner

US 8,788,391 B2

NUMERICAL MODELLING APPARATUS

BACKGROUND

1. Technical Field

The present invention relates generally to the field of computer-implemented apparatus for numerical modelling, and more particularly to computer apparatus and computer-implemented method for numerical modelling of financial assets.

2. Description of Related Art

It is known to provide computer-implemented financial modelling tools that attempt to model or predict possible outcomes in relation to various financial assets. These tools are relatively complex, and are typically implemented using computer apparatus with sufficient memory, processing power, etc to perform the necessary calculations underlying the relevant model.

There is a long-standing economic theory of equilibrium as the equality of supply and demand in an exchange economy. This equilibrium theory has been developed since the first general formulation by Walras in 1874.

In the related art, some asset pricing models based upon cashflows have been developed outside of an equilibrium framework, for instance by Williams. Later methods like the Capital Asset Pricing Model (CAPM) of Sharpe, Lintner and Mossin are based upon the Mean-Variance Portfolio Construction Approach of Markowitz and the Tobin Separation Theorem.

The Mean-Variance approach uses a set of expected returns (the Mean part) and a variance-covariance matrix (the Variance part). This Mean-Variance approach presupposes that a probability distribution for returns is available and only the first two moments of the distribution are employed, so that higher order moments, like skew and kurtosis, are neglected. Thus the statistical basis of the Mean-Variance and its limitations have been pointed out by many parties since it was developed.

The CAPM was built with the Mean-Variance framework as its description of risk. The CAPM often described as an equilibrium theory because if all market participants share the same views on expected return and expected covariance of return then they will all hold the same portfolio, suitably levered to allow for their risk tolerance, and market clearing requires this to be the market cap weighted portfolio if markets are efficient.

The CAPM identifies the Market Portfolio as the efficient portfolio. The CAPM lead directly to the development of Market Capitalization investment products and indices that have grown to become the defacto benchmark in many markets, in particular developed equity markets. That is, it is known to provide computer-implemented financial models that output indices representing relative performance of a portfolio of financial assets, or provide portfolio constructions that allow a portfolio of the financial assets to be bought or sold.

As further background information see:

Williams, John Burr. 1938. The Theory of Investment Value, Harvard University Press, Cambridge Mass.

Lintner, John. 1965. The Valuation of Risk Assets and the Selection of Risky Investments in Stock Portfolios and Capital Budgets. Review of Economics and Statistics. 47:1, pp. 13-37.

Markowitz, Harry. 1952. Portfolio Selection. Journal of Finance. 7:1, pp. 77-91.

Markowitz, Harry. 1959. Portfolio Selection: Efficient Diversification of Investments. Cowles Foundation Monograph No. 16. New York: John Wiley & Sons, Inc.

Markowitz, Harry. 2008. CAPM Investors Do Not Get Paid for Bearing Risk: A Linear Relation Does Not Imply Payment for Risk. Journal of Portfolio Management. 34:2 (Winter), pp. 91-94

Mossin, January 1966, Equilibrium in a Capital Asset Market, Econometrica, 34, pp. 768-783.

Roll, Richard. 1977. A Critique of the Asset Pricing Theory's Tests. Journal of Financial Economics, 4:2, pp. 129-176.

Sharpe, William F. 1964. Capital Asset Prices: A Theory of Market Equilibrium under Conditions of Risk. Journal of Finance. 19:3, pp. 425-442.

Tobin, James. 1958. Liquidity Preference as Behavior Toward Risk. Review of Economic Studies. 67, pp. 65-86.

Choueifaty, Yves and Yves Coignard, 2008. Toward Maximum Diversification, Journal of Portfolio Management. Fall 2008, 35:1, pp. 40-51.

A problem arises in that the market capitalization weighted proxies to the market portfolio have been demonstrated ex-post to be less efficient than a number of other methods of portfolio construction over long periods. Other criticisms have been made of the assumptions of the CAPM and ability to empirically prove the CAPM, such as in Roll. This has lead to a number of other approaches being developed to attempt to provide more efficient portfolios than the market capitalization weighted portfolios. These have included fundamental indexation by Arnott in U.S. Pat. No. 7,620,577, non-constant functions of capitalization weights by Fernholz in U.S. Pat. No. 5,819,238, and diversification based constructions by Choueifaty in US2008/222,252A1, and other more generic equally weighted and minimum variance portfolios.

It is now desired to provide an apparatus and method to implement a financial modelling tool. In particular, an apparatus and method are desired which output more detailed and/or more accurate financial modelling information.

SUMMARY OF THE INVENTION

According to the present invention there is provided an apparatus and method as set forth in the appended claims. Other features of the invention will be apparent from the dependent claims, and the description which follows.

In one aspect there is provided a numerical modelling apparatus, the apparatus comprising: an input unit arranged to receive signals containing data having information relating to a set of assets; a processor unit arranged to: a) provide a Risk Relation Matrix v having a plurality of elements, wherein each of the elements represents a relationship of risk related to a respective pair of the assets and each element is given by a scalar product of two risk vectors, such that each of the assets has an associated risk vector according to the elements of the risk relation matrix; b) decompose the Risk Relation Matrix v into eigenvectors and eigenvalues according to: $V = E \cdot \Lambda \cdot E'$ wherein E is a set of eigenvectors of the risk matrix v in columns, $\Lambda$ is the corresponding diagonal eigenvalue matrix, and E' is the transpose of E; and c) derive components of each of the risk vectors in the basis of unit independent risks by the corresponding row of the matrix product $E \cdot \Lambda^{1/2}$ relating to each of the assets; and an output unit arranged to output the components of each of the risk vectors as a risk vector data set onto a tangible computer-readable recording medium.

In one aspect, the input unit is arranged to receive risk information relating to the set of assets and provide the risk information to the processor unit.

In one aspect, the input unit is arranged to receive the Risk Relation Matrix as the risk information and to provide the Risk Relation Matrix to the processor unit.

In one aspect, the input unit is arranged to receive the risk vectors as the risk information and the processor unit is arranged to provide the Risk Relation Matrix from the risk vectors.

In one aspect, the processor unit is arranged to provide a dataset of portfolio weights w for each of the assets according to:

$$w \propto E \cdot \Lambda^{-1/2} \cdot 1$$

where E is a set of eigenvectors of the risk matrix v in columns and $\Lambda$ is the diagonal eigenvalue matrix and 1 is a column vector all of whose elements are equal to one.

In one aspect, the output unit is arranged to output the portfolio weightings w relating to the set of assets.

In one aspect, the processor unit is arranged to provide a dataset of expected returns R for each of the assets as a vector according to:

$$R \propto E \cdot \Lambda^{1/2} \cdot 1$$

where E is a set of eigenvectors of the risk matrix v in columns and $\Lambda$ is the corresponding diagonal eigenvalue matrix and 1 is a column vector all of whose elements are equal to one.

In one aspect, the output unit is arranged to output the expected returns R relating to the set of assets.

In one aspect, the processor unit is arranged to obtain a dataset of portfolio weightings w relating to each of the assets, wherein the portfolio weightings w are provided as a column vector from:

$$D = \frac{w' \cdot E \cdot \Lambda^{1/2} \cdot 1}{\sqrt{w' \cdot V \cdot w}}$$

where w represents a column vector containing portfolio weights, E is the eigenvector matrix and $\Lambda$ is a corresponding diagonal eigenvalue matrix of the Risk Relation Matrix V for the set of assets, and D is an Objective Function relating to the set of assets.

In one aspect, the output unit is arranged to output the value of the Objective Function as a Diversification Measure relating to the set of assets.

In one aspect, the input unit is arranged to receive one or more constraints relating to the set of assets, and the processor unit is arranged to optimise the Objective Function D by variation of the portfolio weights w subject to the constraints.

In one aspect, the processor unit is further arranged to collect the portfolio weights w at a plurality of time intervals.

In one aspect, the processor unit is further arranged to provide a Price Index based on the price information and the collected weights relating to the set of assets.

In one aspect, the output unit is arranged to output the Price Index as a Benchmark Index relating to the set of assets.

In one aspect there is provided a method of performing numerical modelling using a computer apparatus, the method comprising: receiving signals at an input unit of the computer apparatus, the signals containing data having information relating to a set of assets; providing a Risk Relation Matrix v using a processor unit of the computer apparatus, wherein the Risk Relation Matrix v comprises a plurality of elements, wherein each of the elements represents a relationship of risk related to a respective pair of the assets and each element is given by a scalar product of two risk vectors, such that each of the assets has an associated risk vector according to the elements of the risk relation matrix; decomposing the Risk Relation Matrix v into eigenvectors and eigenvalues according to: $V = E \cdot \Lambda \cdot E'$ wherein E is a set of eigenvectors of the risk matrix v in columns, $\Lambda$ is the corresponding diagonal eigenvalue matrix, and E' is the transpose of E; and deriving components of each of the risk vectors in the basis of unit independent risks by the corresponding row of the matrix product $E \cdot \Lambda^{1/2}$ relating to each of the assets; and outputting the components of each of the risk vectors as a risk vector data set onto a tangible computer-readable recording medium.

In one aspect there is provided a tangible computer-readable recording medium having recorded thereon instructions which when implemented by a computer apparatus perform a method of numerical modelling, wherein the method comprises the steps of: receiving signals at an input unit of the computer apparatus, the signals containing data having information relating to a set of assets; providing a Risk Relation Matrix v using a processor unit of the computer apparatus, wherein the Risk Relation Matrix v comprises a plurality of elements, wherein each of the elements represents a relationship of risk related to a respective pair of the assets and each element is given by a scalar product of two risk vectors, such that each of the assets has an associated risk vector according to the elements of the risk relation matrix; decomposing the Risk Relation Matrix v into eigenvectors and eigenvalues according to: $V = E \cdot \Lambda \cdot E'$ wherein E is a set of eigenvectors of the risk matrix v in columns, $\Lambda$ is the corresponding diagonal eigenvalue matrix, and E' is the transpose of E; and deriving components of each of the risk vectors in the basis of unit independent risks by the corresponding row of the matrix product $E \cdot \Lambda^{1/2}$ relating to each of the assets; and outputting the components of each of the risk vectors as a risk vector data set onto a tangible computer-readable recording medium.

In one aspect, an apparatus is provided that receives a set of inputs representing data relevant to a set of financial assets, makes calculations based on those inputs according to a predetermined model, and produces one or more outputs representing data relevant to the set of assets. In one aspect, the apparatus includes an input unit, a processor unit, and an output unit. In one aspect, the processor unit is arranged to receive signals containing data having information, such as price information and/or risk information, relating to a set of assets; provide a Risk Relation Matrix having a plurality of elements, wherein each of the elements represents a relationship of risk related to a respective pair of the assets and each element is given by a scalar product of two risk vectors, such that each of the assets has an associated risk vector according to the elements of the risk relation matrix; derive components of each of the risk vectors in the basis of unit independent risks; and output the components of each of the risk vectors as a risk vector data set.

In one aspect, a method is provided for performing numerical modelling using a computer apparatus. The method may comprise receiving signals containing data having information relating to a set of assets; providing a Risk Relation Matrix having a plurality of elements, wherein each of the elements represents a relationship of risk related to a respective pair of the assets and each element is given by a scalar product of two risk vectors, such that each of the assets has an associated risk vector according to the elements of the risk relation matrix; deriving components of each of the risk vectors in the basis of unit independent risks; and outputting the components of each of the risk vectors as a risk vector data set.

In one aspect, an equilibrium is established in the model when independent risk factors with the same magnitude of risk have identical expected excess returns. In one aspect the model performs calculations on the basis of a risk relation matrix. In one aspect, the model provides asset independent risk vectors.

In one aspect, a portfolio is determined with optimal expected excess return to risk given a risk magnitude for each asset and a risk correlation between each pair of assets. In one aspect, a diversification measure is provided for any portfolio of assets given the asset risks and the risk correlation between each pair of assets. In one aspect there is provided a history of portfolio weights that form a benchmark index for any selected universe of assets.

In one aspect, a set of portfolio weightings is output. In one example, optimal constrained or unconstrained portfolio weights are output. Suitably, a portfolio of financial assets is constructed according to the weightings. Advantageously, such a portfolio may have improved performance relative to the other portfolio constructions. In one aspect, such improved performance is measured by an indicator including, for example, a risk adjusted return of the set of assets for asset prices, risks and expected returns. In one aspect, the portfolio may have the optimal expected excess returns for unit risk.

In one aspect, a diversification measure for portfolios is output. That is, the apparatus and method outputs a measure that can be used to compare different portfolios.

In one aspect, a benchmark index is output that can be employed to measure performance, such as a benchmark index that is used by investors to measure the performance of their investments.

BRIEF DESCRIPTION OF THE DRAWINGS

For a better understanding of the invention, and to show how example embodiments may be carried into effect, reference will now be made to the accompanying drawings in which.

DETAILED DESCRIPTION OF THE EXAMPLE EMBODIMENTS

The example embodiments will be described in relation to a computer-implemented financial modelling tool that supports a model in relation to various financial assets.

Figure 1:
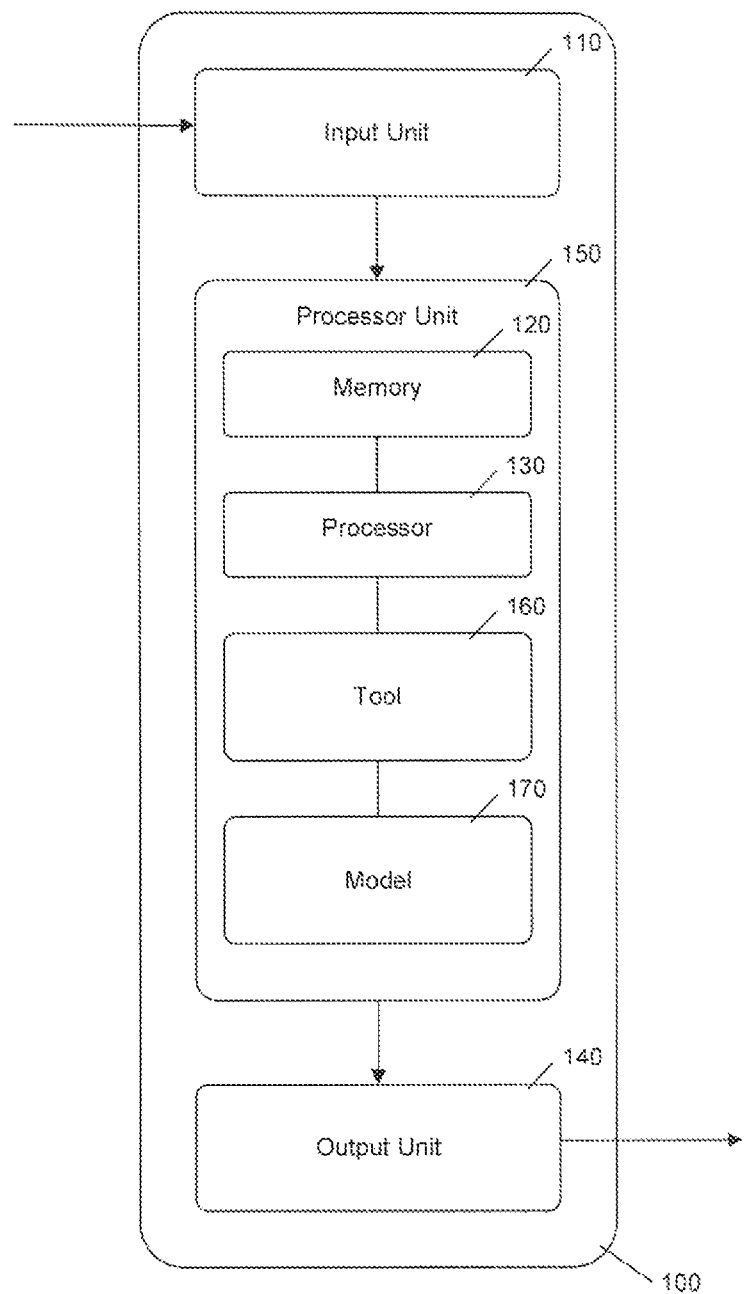
FIG. 1 is a schematic view of a numerical modelling apparatus according to one example embodiment.

FIG. 1 is a schematic view of a numerical modelling apparatus according to one example embodiment. In FIG. 1, the apparatus 100 comprises an input unit 110, a memory 120, a processor 130 and an output unit 140. The input unit 110 receives input data and user commands from any suitable interface. The memory 120 and the processor 130 together form a processor unit 150 that operates to perform calculations on the input data and to store the results of these calculations in the memory 120. The output unit 140 outputs the stored results through any suitable interface onto any suitable recording medium or display device. In one example, the apparatus 100 is a general purpose computing platform, such as a desktop computer or server computer, as will be familiar to those skilled in the art.

As shown in FIG. 1, the memory 120 and the processor 130 provide a tool 160 that performs financial modelling according to a predetermined model 170. This tool 160 uses the input data to perform calculations according to the predetermined model 170, and produces one or more outputs representing data relevant to the set of financial assets.

In one example, the input unit 110 is arranged to receive signals containing data having information relating to a set of assets. Conveniently, the input unit 110 receives price information relating to a plurality of financial assets. In one example, the input unit 110 receives an asset identifier for each asset and at least one price or return relating to each asset. Optionally, the price information is more detailed and may include further variables, such as a historical price set giving price information at various points in time relating to this asset. The price information may be incomplete, e.g. for some assets the price is provided for some points in time but not others. Optionally, the received price data is then processed by the tool 160 to provide a working set of prices, such as by interpolation to fill in the missing data items. In one example, the input unit 110 is arranged to receive signals containing data having risk information relating to the set of assets. As an example, the risk information is option implied volatility. In one example, the input unit 110 receives implied volatility data without reference to prices (or returns). In one example, the input unit 110 receives both the price information and the risk information.

The output unit 140 suitably records the output data onto a non-transient computer-readable recording medium. In one example, the output unit 140 outputs the data onto a hard disk drive or an optical disc. In another example, the output unit 140 further outputs the data onto a human-readable display device, such as a printer or a display screen.

The present model 170 is based on an improved description of the risk associated with the assets. When the primary preference of investors in financial assets is for greatest financial return for the lowest possible risk over an investment window, and if all rational investors behave in this manner, then prices should move to reflect this preference. When risk can be attributed to any asset to have a positive magnitude, it is possible to describe this risk as a vector whose basis is the set of all orthogonal, and hence independent, risk factors. Two risky assets have risks which are independent when the scalar product of two vectors describing the risk of each asset is zero. In the present model, an equilibrium occurs between two or more assets or portfolios which are described by independent orthogonal risk basis vectors when the excess expected return over cash divided by the risk magnitude is identical for all of the individual risk basis vectors. To invest optimally in terms of the excess expected return to risk ratio when such an equilibrium has been established between the assets in an investment universe requires a mechanism for providing such an optimal portfolio subject to operational constraints. The present model 170 described here provides the weightings of the assets for such an optimal investment portfolio.

The present model 170 identifies that the pricing of independent risk in efficient financial markets must be such that an equilibrium is established. Here, the ratio of excess expected return to risk for two different independent sources of risk should be the same. In other words, independent risks are rewarded commensurately.

The present model 170 describes the risk of a general asset as a vector in the space of independent risks. The magnitude of the vector is the scalar measure of risk. A Risk Relation Matrix is made up of elements which are the scalar products of the risk vectors of pairs of asset risk vectors, represented in a basis of independent risk vectors. Risk is an input to the system. Asset risk implicitly reflects all available information that affects price; such information may include, for example, the supply of and demand for any financial asset or set of assets.

Since the excess expected return to risk ratio is the same for all independent risks describing risk of the assets in the model at any given time, and given the description of risk within the model, the expected excess returns of an asset is determined within the model as a scalar multiple of the sum of the expected excess returns (also known as risk premia) of all the independent risks represented in an asset risk vector. This provides a risk premium (expected excess return) to within the same scalar multiple for each asset in the investment universe. The relative expected excess returns can then be used in an objective function. The objective function can then be maximised subject to constraints to produce the efficient portfolio. The portfolio weights provided by the model are optimal weights when independent risks are priced according to the model. The model objective function also provides a unique measure of diversification.

Figure 2:
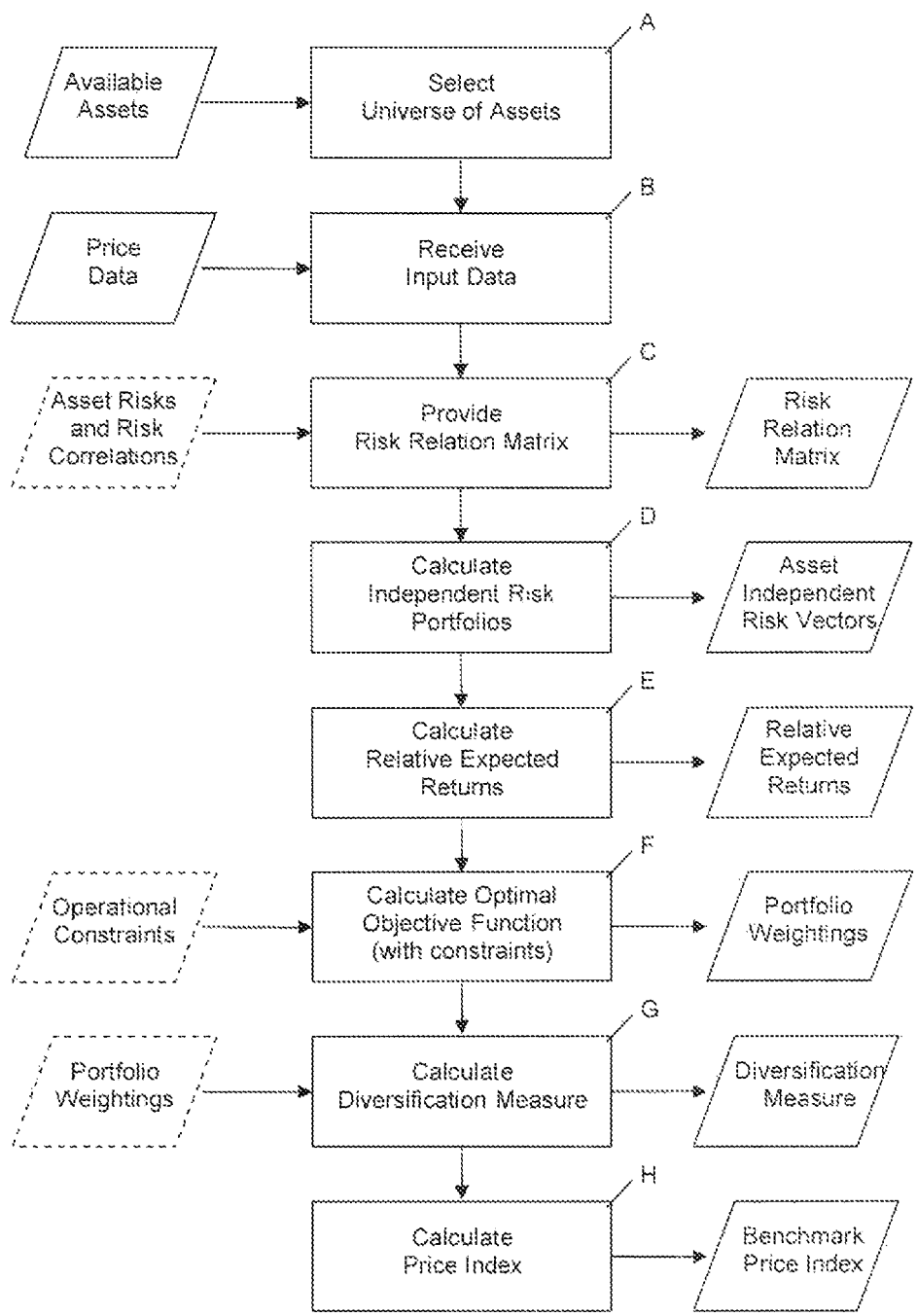
FIG. 2 is a flowchart showing processes performed within the example numerical modelling apparatus.

FIG. 2 is a schematic flowchart of processes performed within the example apparatus of FIG. 1. Here, the flowchart illustrates various inputs that are received by the processes A-G, and the outputs that may be generated from these processes.

Process A: From the set of all possible assets available to investors, a subset of these is selected. The selection may be produced by screening the set of all possible investments by any suitable criterion; in some embodiments the screen can be based upon liquidity of the asset; in some embodiments the screen can be based upon the market capitalization of the asset; in some embodiments the screen can be activated on an asset because of a lack of sufficient data to proceed with the method; any screening criterion that leaves assets in the selected universe can be used within the system. The Input for Process A is the set of all assets available to investors and screens employed. The size of the asset universe selected is denoted here as N.

Process B: Data is collected for the set of all assets in the universe of assets selected in Process A. In some embodiments this data includes asset identifiers; in some embodiments this data includes asset prices on a periodic frequency; in some embodiments this data includes expected risks over an investment period; in some embodiments this data includes expected risk correlation between assets over an investment period; in some embodiments this data includes the Risk Relation Matrix between the assets; in some embodiments the risk is given by asset volatilities implied from derivative asset prices over a known tenor (time basis).

Process C: A Risk Relation Matrix expected over the investment period is required by the process. It is denoted here by the symbol v. In some embodiments, this is provided as input to the system; in some embodiments, the Risk Relation Matrix is determined from the input data provided to Process B. In some embodiments, the Risk Relation Matrix can be approximated by a Variance-Covariance matrix; in some embodiments the Risk Relation Matrix is determined from the asset risk data; in some embodiments it is determined from the risk correlation matrix; in some embodiments the Risk Relation Matrix is symmetric positive definite; in some embodiments the output of Process C is the Risk Relation Matrix.

Process D: The Independent Risk Portfolios are provided by Process D; in some embodiments the Independent Risks are determined from the eigenvector matrix, E, and the corresponding diagonal eigenvalue matrix, $\Lambda$, of the Risk Relation Matrix, v, so that $$V = E \cdot \Lambda \cdot E' \quad (1)$$

In this equation, the symbol "·" represents the operation of an inner product between matrices. In some embodiments one or more eigenvectors of v, each a column of the matrix E, have all elements multiplied by negative 1 to ensure that the risk premium of the corresponding independent risk vector is positive. In some embodiments the components of the independent risk vectors are given as the components of the eigenvector scaled by the positive square root of the associated eigenvalue so that the magnitude of each independent risk vector is one by construction. In some embodiments the risk of each asset in the selected universe is expressed as a vector in the basis of the independent risks, where the magnitude of the said vector is the risk of the said asset given by the norm of the said vector. In some embodiments the components of the asset risk vector in the basis of independent risks for an asset is given by the row of the matrix product $E \cdot \Lambda^{1/2}$ corresponding to the same said asset. In some embodiments some of the independent risk vectors can be neglected so that a subspace of the basis of the independent risk vectors is employed by the process. The Process D provides the components of the risk vector for each asset in the basis of the independent risk vectors, or any other appropriate derived basis.

Process E: The Expected Excess Returns over cash, denoted here as the vector R, to within a common scalar multiple are represented in some embodiments as the sum of the components of the vector of independent risks so that, given as scalar product of the eigenvector matrix E, the square root of the eigenvalue matrix $\Lambda^{1/2}$ and a column vector all of whose elements have value one, denoted by 1, $$R \propto E \cdot \Lambda^{1/2} \cdot 1 \quad (2)$$

Process F: The objective function D given in some embodiments of the model by the expression:

$$D = \frac{w' \cdot E \cdot \Lambda^{1/2} \cdot 1}{\sqrt{w' \cdot V \cdot w}} \quad (3)$$

where w represents a column vector containing portfolio weights, E is the eigenvalue matrix and $\Lambda$ is the corresponding diagonal eigenvalue matrix of the Risk Relation Matrix V for the universe of assets selected. The objective function D may be represented in other equivalent forms.

In some embodiments, operational constraints on the magnitude of the asset weights are provided to the system. In some embodiments operational derived quantities derived from the weights of the assets are provided to the system. In some embodiments the constraints include a maximum total exposure in terms of the sum of asset weights. In some embodiments constraints derived from asset properties are employed. The constraints derived from asset properties are possibly non-linear. The constraints are, for example, total portfolio risk, or tracking error to another portfolio. In some embodiments the weights may be constrained to being positive.

In one embodiment, the objective function D is maximised by variation of the asset weights w subject to the operational constraints provided to the system. The process need not be constrained in some embodiments to provide the resulting portfolio of weights w to within a scaling factor as $$w \propto E \cdot \Lambda^{-1/2} \cdot 1 \quad (4)$$

The resulting weights w from any embodiment are then provided as a vector of real numbers as output from Process F.

Process G: Any portfolio weightings for the set of assets selected in Process A can be provided to Process G. In some embodiments the portfolio weights w are provided to Process G from Process F. In some embodiments the portfolio weights w are provided directly as input to Process G. In the Process G, the objective function D is determined as $$D = \frac{w' \cdot E \cdot \Lambda^{1/2} \cdot 1}{\sqrt{w' \cdot V \cdot w}} \quad (5)$$

and is provided as a scalar diversification number (or equivalently measure) as output from Process G.

Process H: This process collects the weights determined from process F applied to data related to calendar date/times at a given frequency. In some embodiments this will be monthly; in some embodiments this frequency will be quarterly; in some embodiments it will be at some other frequency. The asset price series input and asset weights provided by the Process F on different dates are used to create a Price Index, possibly adjusted for corporate actions like dividends. In one example, the Price Index is output by the model as a Benchmark Index.

In summary, the apparatus and method described herein provide a novel portfolio construction that can improve the risk adjusted return of a set of assets for asset prices, risks and expected returns relative to the other portfolio construction methods. In some example embodiments, the apparatus and method provide: a risk relation matrix; Asset Independent Risk vectors; optimal constrained and unconstrained portfolio weights with the best expected returns; a diversification measure for portfolios; and/or a benchmark index that can be employed by investors against which they can measure the performance of their investments. When asset markets are in a desired equilibrium, the portfolio formed by the weights provided by the system and method can have the best expected excess returns for unit risk.

At least some of the example embodiments may be constructed, partially or wholly, using dedicated special-purpose hardware. Terms such as 'component', 'module' or 'unit' used herein may include, but are not limited to, a hardware device, such as a Field Programmable Gate Array (FPGA) or Application Specific Integrated Circuit (ASIC), which performs certain tasks.

Also, elements of the example embodiments may be configured to reside on an addressable storage medium and be configured to execute on one or more processors. That is, some of the example embodiments may be implemented in the form of a computer-readable storage medium having recorded thereon instructions that are, in use, executed by a computer system. The medium may take any suitable form but examples include solid-state memory devices (ROM, RAM, EPROM, EEPROM, etc.), optical discs (e.g. Compact Discs, DVDs, Blu-Ray discs and others), magnetic discs, magnetic tapes and magneto-optic storage devices.

In some cases the medium is distributed over a plurality of separate computing devices that are coupled by a suitable communications network, such as a wired network or wireless network. Thus, functional elements of the invention may in some embodiments include, by way of example, components such as software components, object-oriented software components, class components and task components, processes, functions, attributes, procedures, subroutines, segments of program code, drivers, firmware, microcode, circuitry, data, databases, data structures, tables, arrays, and variables.

Further, although the example embodiments have been described with reference to the components, modules and units discussed herein, such functional elements may be combined into fewer elements or separated into additional elements.

Although a few preferred embodiments have been shown and described, it will be appreciated by those skilled in the art that various changes and modifications might be made without departing from the scope of the invention, as defined in the appended claims.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings) or to any novel one, or any novel combination, of the steps of any method or process so disclosed.

What is claimed is:

1. numerical modelling apparatus, the apparatus comprising:
   an input unit arranged to receive signals containing data having information relating to a set of assets;
   processor unit coupled to the input unit and arranged to:
   a) provide matrix V having plurality of elements, wherein each of the elements represents relationship of risk related to respective pair of the assets, and wherein each element is given by scalar product of two risk vectors, such that each of the assets has an associated risk vector according to the elements of the matrix;
   b) decompose the matrix V into eigenvectors and eigenvalues according to:

$$V = E \cdot \Lambda \cdot E'$$

wherein E is set of eigenvectors of the matrix V in columns, $\Lambda$ is the corresponding diagonal eigenvalue matrix, and E' is the transpose of E;
   c) provide dataset of portfolio weights w for each of the assets according to:

$$w \propto E \cdot \Lambda^{-1/2} \cdot 1$$

where E is set of eigenvectors of the matrix V in columns and $\Lambda$ is the diagonal eigenvalue matrix and 1 is column vector all of whose elements are equal to one, wherein the portfolio weightings w are provided as column vector from:

$$D = \frac{w' \cdot E \cdot \Lambda^{1/2} \cdot 1}{\sqrt{w' \cdot V \cdot w}}$$

where w represents column vector containing portfolio weights, E is the eigenvector matrix and Λ is corresponding diagonal eigenvalue matrix of the matrix V for the set of assets, and D is an Objective Function relating to the set of assets; and d) derive components of each of the risk vectors in the basis of unit independent risks by the corresponding row of the matrix product $E \cdot \Lambda^{1/2}$ relating to each of the assets; and an output unit coupled to the processor unit and arranged to output the components of each of the risk vectors as risk vector dataset onto tangible computer-readable recording medium or display device.

2. The apparatus of claim 1, wherein the input unit is arranged to receive risk information relating to the set of assets and provide the risk information to the processor unit.

3. The apparatus of claim 2, wherein the input unit is arranged to receive the matrix as the risk information and to provide the matrix to the processor unit.

4. The apparatus of claim 2, wherein the input unit is arranged to receive the risk vectors as the risk information and the processor unit is arranged to provide the matrix from the risk vectors.

5. The apparatus of claim 1, wherein the output unit is arranged to output the portfolio weightings w relating to the set of assets.

6. The apparatus of claim 1, wherein the processor unit is arranged to provide dataset of expected returns R for each of the assets as vector according to:

$$R \propto E \cdot \Lambda^{1/2} \cdot 1$$

where E is set of eigenvectors of the matrix V in columns and Λ is the corresponding diagonal eigenvalue matrix and 1 is column vector all of whose elements are equal to one.

7. The apparatus of claim 6, wherein the output unit is arranged to output the expected returns R relating to the set of assets.

8. The apparatus of claim 1, wherein the output unit is arranged to output the value of the Objective Function as Diversification Measure relating to the set of assets.

9. The apparatus of claim 1, wherein the input unit is arranged to receive one or more constraints relating to the set of assets, and the processor unit is arranged to optimise the Objective Function D by variation of the portfolio weights w subject to the constraints.

10. The apparatus of claim 1, wherein the processor unit is further arranged to collect the portfolio weights w at plurality of time intervals.

11. The apparatus of claim 10, wherein the processor unit is further arranged to provide Price Index based on the price information and the collected weights relating to the set of assets.

12. The apparatus of claim 11, wherein the output unit is arranged to output the Price Index as Benchmark Index relating to the set of assets.

13. A method of performing numerical modeling of investment risk relating to financial assets using computer apparatus, the method comprising:

receiving signals at an input unit of the computer apparatus, the signals containing data having information relating to set of financial assets;

providing, by processor unit of the computer apparatus, matrix V, wherein the matrix V comprises plurality of elements, wherein each of the elements represents relationship of risk related to respective pair of the financial assets, and wherein each element is given by scalar product of two risk vectors, such that each of the financial assets has an associated risk vector according to the elements of the risk relation matrix;

automatically decomposing, by the processor unit of the computer apparatus, the matrix V into eigenvectors and eigenvalues according to:

$$V = E \cdot \Lambda \cdot E'$$

wherein E is set of eigenvectors of the matrix V in columns, Λ is the corresponding diagonal eigenvalue matrix, and E' is the transpose of E;

providing, by the processor unit of the computer apparatus, dataset of portfolio weights w for each of the assets according to:

$$w \propto E \cdot \Lambda^{-1/2} \cdot 1$$

where E is set of eigenvectors of the matrix V in columns Λ is the diagonal eigenvalue matrix and 1 is column vector all of whose elements are equal to one, wherein the portfolio weightings w are provided as column vector from:

$$D = \frac{w' \cdot E \cdot \Lambda^{1/2} \cdot 1}{\sqrt{w' \cdot V \cdot w}}$$

where w represents column vector containing portfolio weights, E is the eigenvector matrix and Λ is corresponding diagonal eigenvalue matrix of the matrix V for the set of assets, and D is an Objective Function relating to the set of assets; and deriving, by the processor unit of the computer apparatus, components of each of the risk vectors in the basis of unit independent risks by the corresponding row of the matrix product $E \cdot \Lambda^{1/2}$ relating to each of the financial assets; and outputting, by the computer apparatus, the components of each of the risk vectors as a risk vector data set corresponding to investment risks relating to respective financial assets onto a tangible computer-readable recording medium or display device configured for use by user to evaluate portfolio of at least portion of the financial assets.

14. non-transitory tangible computer-readable recording medium having recorded thereon instructions to cause a computer apparatus to perform operations comprising:

receiving signals at an input unit of the computer apparatus, the signals containing data having information relating to set of assets;

providing, by a processor unit of the computer apparatus, matrix V, wherein the matrix V comprises plurality of elements, wherein each of the elements represents relationship of risk related to respective pair of the assets, and wherein each element is given by scalar product of two risk vectors, such that each of the assets has an associated risk vector according to the elements of the matrix;

decomposing, by the processor unit of the computer apparatus, the matrix V into eigenvectors and eigenvalues according to:

$$V = E \cdot \Lambda \cdot E'$$

wherein E is set of eigenvectors of the risk matrix V in columns, Λ is the corresponding diagonal eigenvalue matrix, and E' is the transpose of E;

providing, by the processor unit of the computer apparatus, dataset of portfolio weights w for each of the assets according to:

$$w \propto E \cdot \Lambda^{-1/2} \cdot 1$$

where E is set of eigenvectors of the matrix V in columns and $\Lambda$ is the diagonal eigenvalue matrix and 1 is column vector all of whose elements are equal to one, wherein the portfolio weightings w are provided as column vector from:

$$D = \frac{w' \cdot E \cdot \Lambda^{1/2} \cdot 1}{\sqrt{w' \cdot V \cdot w}}$$

where w represents column vector containing portfolio weights, E is the eigenvector matrix and $\Lambda$ is corresponding diagonal eigenvalue matrix of the matrix V for the set of assets, and D is an Objective Function relating to the set of assets; and deriving by the processor unit of the computer apparatus, components of each of the risk vectors in the basis of unit independent risks by the corresponding row of the matrix product $E \cdot \Lambda^{1/2}$ relating to each of the assets; and outputting, by the computer apparatus, the components of each of the risk vectors as a risk vector dataset onto tangible computer-readable recording medium or display device.

\* \* \* \* \*